(12) United States Patent
Jönsson

(10) Patent No.: US 12,103,199 B2
(45) Date of Patent: Oct. 1, 2024

(54) ROTATABLE CUTTING CHAIN WORK TOOL, A WALL SAW ARRANGEMENT COMPRISING SUCH A WORK TOOL, AN ANNULAR MEMBER AND A METHOD FOR PRODUCING AN ANNULAR MEMBER

(71) Applicant: HUSQVARNA AB, Huskvarna (SE)

(72) Inventor: Andreas Jönsson, Hallsberg (SE)

(73) Assignee: HUSQVARNA AB, Huskvarna (SE)

( * ) Notice: Subject to any disclaimer, the term of this patent is extended or adjusted under 35 U.S.C. 154(b) by 407 days.

(21) Appl. No.: 17/605,169

(22) PCT Filed: Jun. 4, 2020

(86) PCT No.: PCT/SE2020/050567
§ 371 (c)(1),
(2) Date: Oct. 20, 2021

(87) PCT Pub. No.: WO2020/263154
PCT Pub. Date: Dec. 30, 2020

(65) Prior Publication Data
US 2022/0184849 A1    Jun. 16, 2022

(30) Foreign Application Priority Data
Jun. 24, 2019   (SE) .................................. 1950774-8

(51) Int. Cl.
*B28D 1/08*         (2006.01)
*B23D 45/16*        (2006.01)
(Continued)

(52) U.S. Cl.
CPC ............. *B28D 1/082* (2013.01); *B23D 45/16* (2013.01); *B23D 47/123* (2013.01);
(Continued)

(58) Field of Classification Search
CPC ........ B28D 1/082; B28D 1/045; B23D 45/16; B23D 47/123; B23D 57/023; B23D 1/025;
(Continued)

(56) References Cited

U.S. PATENT DOCUMENTS

| 710,838 A | 10/1902 | Brines |
| 1,619,128 A * | 3/1927 | Jobst .................... B23D 57/026 |
| | | 125/21 |

(Continued)

FOREIGN PATENT DOCUMENTS

| BE | 789372 A | 1/1973 |
| BE | 850277 A | 5/1977 |

(Continued)

OTHER PUBLICATIONS

Search Report and Office Action for Swedish Application No. 1950774-8 mailed Jan. 27, 2020.

(Continued)

*Primary Examiner* — Omar Flores Sanchez
(74) *Attorney, Agent, or Firm* — Burr & Forman LLP

(57) ABSTRACT

A work tool (100) comprising: a cutting chain (110), a drive mechanism for driving the cutting chain (110), an annular member (120) arranged rotatably supported by one or more support rollers (130,140,150), wherein the annular member comprises a rim (230) adapted to support the cutting chain (110) during cutting, and a support wheel (160) arranged distanced from the annular member (120), wherein the cutting chain (110) is arranged supported on a rim segment (102) of the annular member (110) forming part of a cutting area of the tool (100) and supported on a rim segment (103) of the support wheel (160) in a direction away from the cutting area of the tool (100). An annular member and a method of producing an annular member are also disclosed.

19 Claims, 5 Drawing Sheets

(51) Int. Cl.
  *B23D 47/12* (2006.01)
  *B23D 57/02* (2006.01)
  *B23D 61/02* (2006.01)
  *B27B 5/14* (2006.01)
  *B27B 17/04* (2006.01)
  *B27B 17/06* (2006.01)
  *B27B 17/08* (2006.01)
  *B28D 1/04* (2006.01)

(52) U.S. Cl.
  CPC ......... *B23D 57/023* (2013.01); *B23D 61/025* (2013.01); *B27B 5/14* (2013.01); *B27B 17/04* (2013.01); *B27B 17/06* (2013.01); *B27B 17/08* (2013.01); *B28D 1/045* (2013.01)

(58) Field of Classification Search
  CPC ........... B27B 5/14; B27B 17/06; B27B 17/04; B27B 17/08
  USPC ......................................................... 30/389
  See application file for complete search history.

(56) References Cited

U.S. PATENT DOCUMENTS

| | | | | |
|---|---|---|---|---|
| 2,158,629 | A * | 5/1939 | Lansing | B28D 1/088 125/21 |
| 2,348,612 | A * | 5/1944 | Deacon | B27B 33/148 30/387 |
| 2,702,538 | A | 2/1955 | Burkhardt | |
| 3,247,873 | A | 4/1966 | Aitken et al. | |
| 3,459,169 | A | 8/1969 | Mcnulty | |
| 3,468,351 | A * | 9/1969 | Ehlen | B23D 55/06 30/389 |
| 3,491,806 | A | 1/1970 | Kaisser et al. | |
| 3,545,422 | A | 12/1970 | Mcnulty | |
| 4,097,246 | A * | 6/1978 | Olson | B23D 61/185 125/21 |
| 4,181,115 | A | 1/1980 | Weisner | |
| 4,557,054 | A * | 12/1985 | Beerens | B27B 17/04 30/387 |
| 4,572,303 | A | 2/1986 | Marechal | |
| 4,807,366 | A | 2/1989 | Masato et al. | |
| 4,817,692 | A * | 4/1989 | Denis | A01G 23/091 144/34.1 |
| 4,981,129 | A * | 1/1991 | Osterman | B27B 17/08 30/384 |
| 4,986,252 | A * | 1/1991 | Holmes | B27B 17/14 125/21 |
| 5,119,798 | A * | 6/1992 | Scott | B28D 1/082 125/21 |
| 5,129,160 | A | 7/1992 | Bell | |
| 5,184,598 | A | 2/1993 | Bell | |
| 5,603,311 | A | 2/1997 | Hoerner et al. | |
| 6,119,674 | A * | 9/2000 | Eriksson | B23D 57/0069 125/21 |
| 6,138,658 | A | 10/2000 | Bell | |
| 6,186,136 | B1 | 2/2001 | Osborne | |
| 6,311,598 | B1 | 11/2001 | Osborne | |
| 6,374,501 | B1 | 4/2002 | Claesson | |
| 6,560,880 | B1 * | 5/2003 | Itoh | B27B 5/14 30/389 |
| 6,632,126 | B1 * | 10/2003 | Cogswell | B28D 1/04 451/178 |
| 6,760,983 | B2 | 7/2004 | Fergusson et al. | |
| 7,089,670 | B2 | 8/2006 | Donnerdal | |
| 7,434,575 | B2 | 10/2008 | Lehmann | |
| 8,136,436 | B2 | 3/2012 | Osborne et al. | |
| 8,434,236 | B2 | 5/2013 | Pellenc | |
| 8,651,005 | B2 | 2/2014 | Yancey et al. | |
| 8,707,943 | B2 * | 4/2014 | Berglund | B27B 17/08 125/21 |
| 8,869,787 | B2 | 10/2014 | Thoelking et al. | |
| 8,955,505 | B2 * | 2/2015 | Jonsson | B28D 1/088 451/454 |
| 8,960,178 | B2 * | 2/2015 | Buchholtz | B27B 17/14 125/21 |
| 9,174,360 | B2 * | 11/2015 | Baratta | B28D 1/084 |
| 9,713,881 | B2 | 7/2017 | Zimmermann et al. | |
| 9,744,685 | B2 | 8/2017 | Pellenc | |
| 9,815,220 | B2 | 11/2017 | Madson | |
| 9,895,825 | B2 * | 2/2018 | Gerlach | B28D 1/08 |
| 2006/0054153 | A1 | 3/2006 | Vanderzanden et al. | |
| 2006/0058137 | A1 * | 3/2006 | Matsuura | B28D 1/045 474/139 |
| 2010/0043234 | A1 | 2/2010 | Pellenc | |
| 2010/0288098 | A1 * | 11/2010 | Matsuura | B28D 1/26 173/90 |
| 2011/0167652 | A1 * | 7/2011 | Brehm | B23D 61/025 30/389 |
| 2012/0132051 | A1 | 5/2012 | Moller | |
| 2013/0091715 | A1 | 4/2013 | Zimmermann et al. | |
| 2014/0298963 | A1 | 10/2014 | Ruzich | |
| 2016/0257026 | A1 * | 9/2016 | Lux | B27B 17/02 |
| 2017/0073927 | A1 | 3/2017 | Blundell et al. | |
| 2017/0120354 | A1 * | 5/2017 | Jönsson | B23D 57/02 |
| 2017/0266834 | A1 | 9/2017 | Frey et al. | |
| 2018/0058215 | A1 * | 3/2018 | Eilouti | E21C 25/24 |
| 2018/0141238 | A1 | 5/2018 | Bonomi | |
| 2018/0370066 | A1 * | 12/2018 | Cogswell | B23D 61/08 |

FOREIGN PATENT DOCUMENTS

| | | |
|---|---|---|
| BR | 7705045 A | 5/1978 |
| CH | 657806 A5 | 9/1986 |
| CN | 1131081 A | 9/1996 |
| CN | 1054090 C | 7/2000 |
| CN | 2475540 Y | 2/2002 |
| CN | 200948652 Y | 9/2007 |
| CN | 201128028 Y | 10/2008 |
| CN | 201249290 Y | 6/2009 |
| CN | 201249291 Y | 6/2009 |
| CN | 101502981 A | 8/2009 |
| CN | 101690985 A | 4/2010 |
| CN | 101708564 A | 5/2010 |
| CN | 201816142 U | 5/2011 |
| CN | 102198699 A | 9/2011 |
| CN | 202029251 U | 11/2011 |
| CN | 102574296 A | 7/2012 |
| CN | 203141666 U | 8/2013 |
| CN | 204036671 U | 12/2014 |
| CN | 104669446 A | 6/2015 |
| CN | 104669447 A | 6/2015 |
| CN | 105014799 A | 11/2015 |
| CN | 204955140 U | 1/2016 |
| CN | 205075181 U | 3/2016 |
| CN | 106142359 A | 11/2016 |
| CN | 106142361 A | 11/2016 |
| CN | 106738366 A | 5/2017 |
| CN | 206477846 U | 9/2017 |
| CN | 206605657 U | 11/2017 |
| CN | 206623239 U | 11/2017 |
| CN | 207685817 U | 8/2018 |
| DE | 922935 C | 1/1955 |
| DE | 2536982 A1 | 2/1977 |
| DE | 2536984 A1 | 3/1977 |
| DE | 2734532 A1 | 2/1978 |
| DE | 3413513 A1 | 3/1985 |
| DE | 3446986 A1 | 7/1986 |
| DE | 4301243 A1 | 7/1993 |
| DE | 19953505 A1 | 5/2001 |
| DE | 102010014044 A1 | 10/2011 |
| EP | 0014776 B1 | 1/1982 |
| EP | 0028418 B1 | 3/1984 |
| EP | 0119597 A1 | 9/1984 |
| EP | 0241422 B1 | 6/1991 |
| EP | 0358112 B1 | 4/1992 |
| EP | 0685308 A1 | 12/1995 |
| EP | 1600235 A2 | 11/2005 |
| EP | 2206586 B1 | 5/2013 |
| EP | 3177443 A1 | 6/2017 |
| FR | 2730655 A1 | 8/1996 |
| GB | 704632 A | 2/1954 |

(56) References Cited

FOREIGN PATENT DOCUMENTS

| | | |
|---|---|---|
| GB | 1400440 A | 7/1975 |
| GR | 20090100601 A | 6/2011 |
| JP | S54020487 A | 2/1979 |
| JP | S6079912 A | 5/1985 |
| JP | H0541726 U | 6/1993 |
| JP | H1148033 A | 2/1999 |
| JP | H11-207730 A | 8/1999 |
| JP | 2000096839 A | 4/2000 |
| JP | 2002210727 A | 7/2002 |
| JP | 2002227429 A | 8/2002 |
| JP | 2006198698 A | 8/2006 |
| JP | 2016060123 A | 4/2016 |
| JP | 2019035253 A | 3/2019 |
| KR | 860002900 Y1 | 10/1986 |
| NL | 1008798 C2 | 10/1999 |
| SE | 201100859 A1 | 5/2013 |
| SU | 998127 A1 | 2/1983 |
| SU | 1123858 A1 | 11/1984 |
| WO | 9748532 A1 | 12/1997 |
| WO | 2009098699 A1 | 8/2009 |
| WO | 11089610 A2 | 7/2011 |
| WO | WO-2016139634 A1 * | 9/2016 ......... B27B 17/0008 |

OTHER PUBLICATIONS

International Search Report and Written Opinion for International Application No. PCT/SE2020/050567 mailed Aug. 13, 2020.

\* cited by examiner

ROTATABLE CUTTING CHAIN WORK TOOL, A WALL SAW ARRANGEMENT COMPRISING SUCH A WORK TOOL, AN ANNULAR MEMBER AND A METHOD FOR PRODUCING AN ANNULAR MEMBER

TECHNICAL FIELD

There are disclosed herein work tools for cutting hard materials such as concrete and stone, but also soft materials such as wood. There are also disclosed wall saw arrangements and manufacturing methods for making an annular member suitable for supporting a cutting chain of the tool.

BACKGROUND

Work tools for cutting hard materials such as concrete and stone are often subject to large forces and severe mechanical wear. Also, the generated dust and slurry may cause problems with, e.g., blockage, making it challenging to design high performance durable work tools.

A cut-off disc is commonly used for cutting into hard materials. Abrasive elements are arranged along a rim of a steel disc to abrade the material to be cut. Cut-off discs are relatively heavy and store a significant amount of energy during operation. This weight and stored energy make handling the disc cumbersome. Also, the achievable cutting depth using cut-off discs is limited to about half the diameter of the disc, which is a drawback.

Chain saws have been adapted for abrasive operation and successfully used for cutting hard materials. The chain does not store as much energy as the cut-off disc, which is an advantage since it can be stopped more easily. Also, a chain saw can be designed to cut deeper cuts compared to cut-off discs.

U.S. Pat. No. 4,981,129 discloses a chain saw adapted for cutting into hard materials. However, the cutting chain is subject to mechanical stress causing it to wear out fast.

U.S. Pat. No. 6,119,674 discloses a manually operated cutting device which uses a wire for an abrasive operation to cut hard materials such as concrete and stone. The wire is supported on an annular member which enables deep cuts, but the wire is likely to wear out fast due to the relatively small number of abrasive wire beads arranged on the wire.

There is a need for a rotatable cutting chain work tool with reduced chain wear which enables making deep cuts into hard materials.

SUMMARY

It is an object of the present disclosure to provide a work tool comprising a cutting chain, a drive mechanism for driving the cutting chain, an annular member arranged rotatably supported by one or more support rollers, wherein the annular member comprises a rim adapted to support the cutting chain during cutting, and a support wheel arranged distanced from the annular member away from a cutting area of the work tool. The cutting chain is arranged supported on a rim segment of the annular member forming part of the cutting area of the tool and supported on a rim segment of the support wheel in a direction away from the cutting area of the tool.

This way the chain is supported by the annular member as it cuts into the material. Mechanical stress is evenly distributed across chain links, thereby reducing load on individual chain links. The annular member allows for deep cuts to be made and does not store a significant amount of energy during operation compared to cut-off discs, which is an advantage. Also, it is easier to handle the annular member and chain compared to a large cut-off disc due to the reduced weight. Wire saws for cutting concrete and stone are generally known, but these are fundamentally different from the work tools described herein. The wire does not require to be supported in any particular angle with respect to the material to be cut since it is rotationally symmetric (has a circular cross-section). It is therefore much easier to support a wire on, e.g., an annular member. The work tools described herein solve the problem of supporting a chain on an annular member in an efficient and reliable manner.

According to aspects, the drive mechanism is arranged to drive one or more of the support rollers. This way the drive force is evenly distributed over the chain links via the annular member, which is an advantage since mechanical stress on the individual links is reduced.

According to aspects, a sprocket constitutes one of the support rollers. A sprocket provides a suitable engagement with respect to the annular member, thereby providing an efficient coupling between the power source of the drive mechanism and the annular member.

According to aspects, the drive mechanism is arranged to drive the support wheel. The support wheel is located away from the cutting area of the work tool and therefore conveniently accessible by a drive power source such as an electrical motor or combustion engine. The power source may be directly connected to the support wheel, which is an advantage.

According to aspects, the cutting chain comprises protrusions configured to engage corresponding recesses formed in a rim of the annular member. Thus, the chain will not slide over the metal of the annular member, but rather follow the annular member as it revolves, this further reduces chain wear and leads to an efficient cutting operation.

According to aspects, the annular member is formed by two annular side-plates with an annular center-plate arranged in-between the two side-plates. This sandwich structure is associated with an improved mechanical strength and is also easy to manufacture in a cost efficient manner.

According to aspects, the center-plate has a rim portion comprising recesses configured to engage corresponding protrusions on the cutting chain. The recesses in the center-plate can be cut out instead of machined into the assembled annular member, thereby providing an efficient manufacturing process for producing the annular member. The side plates and the center plate may, e.g., be riveted, glued, or spot welded together, According to aspects, the annular member is replaceable by one or more alternative annular members having different diameters, thereby providing for different speed or torque ratios between cutting chain and drive mechanism. This way a gear-box is not necessary, which is an advantage.

According to aspects, the support wheel is biased in a direction away from the annular member, thereby providing tensioning of the cutting chain.

According to aspects, one or more of the support rollers are biased in a direction away from the support wheel, thereby biasing the annular member in the direction away from the support wheel (160) to provide tensioning of the cutting chain.

A properly tensioned cutting chain reduced chain wear, which is an advantage.

According to aspects, an outer support roller out of the support rollers is removable for flush cutting operation by the work tool. It is an advantage that flush cutting capability can be conveniently obtained by simply removing a support roller from the work tool.

According to aspects, the drive mechanism is powered by an electrical energy storage, such as a rechargeable battery. This electrical energy storage may according to some aspects be an on-board battery, i.e., a battery mounted on the work tool. Due to the reduced weight, the work tool is especially suitable for use with electrical energy storage power sources, such as battery powered electrical motors.

There is also disclosed herein wall saw arrangements, manufacturing methods, and annular members associated with at least some of the above-mentioned advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The present disclosure will now be described more in detail with reference to the appended drawings, where.

DETAILED DESCRIPTION

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

Figure 1:
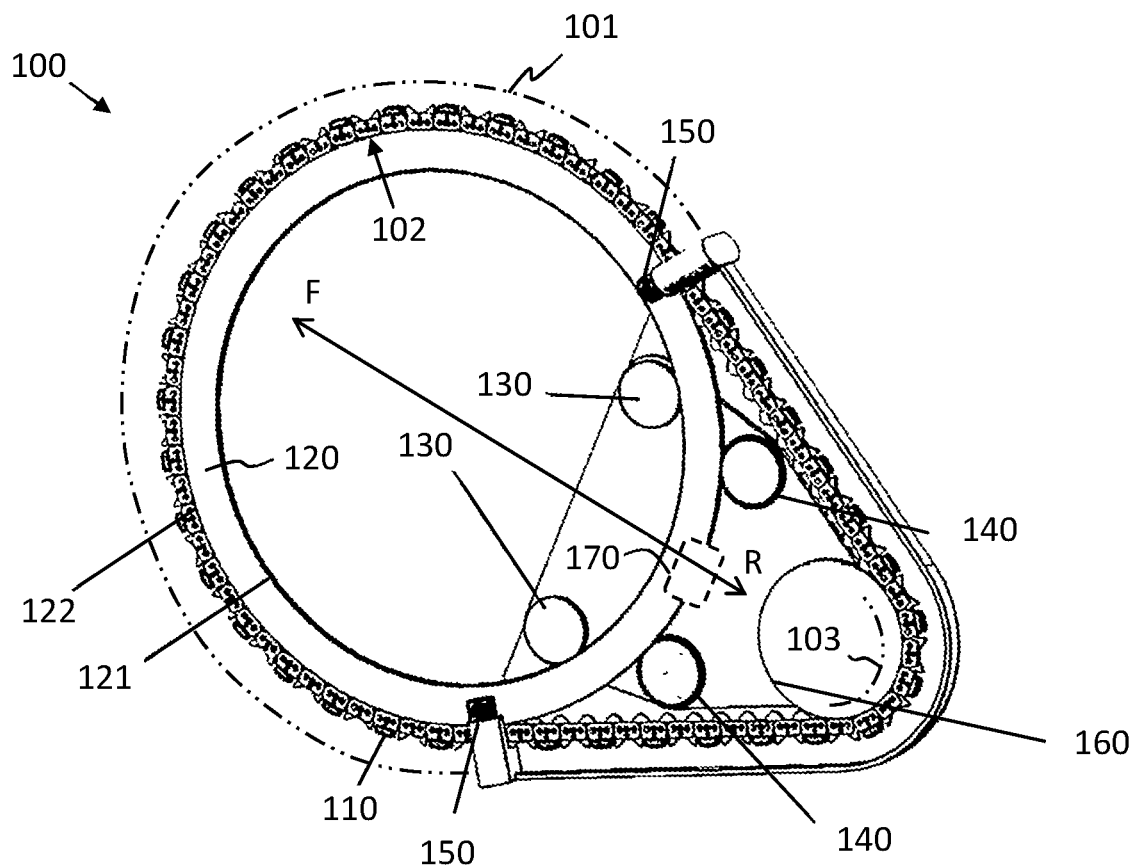
FIG. 1 schematically illustrates a work tool.

FIG. 1 shows a work tool 100 with a cutting area 101. The work tool 100 may according to an example be a handheld power cutter or part of a wall saw arrangement. The tool comprises a cutting chain 110 and a drive mechanism for driving the cutting chain 110 (not shown in FIG. 1).

The drive mechanism comprises a power source and coupling means for coupling the power source to the cutting chain 110 for driving the cutting chain. The work tools discussed herein comprise several different options for both power source and coupling means, as will be discussed in more detail below.

An annular member 120 is arranged rotatably supported by one or more support rollers 130, 140, 150. The annular member 120 is flat with a circular inner edge 121 and a circular outer edge 122 as shown in, e.g., FIGS. 3 and 4. Inner ring support rollers 130 support the inner edge of the annular member 120, while outer ring support rollers 140 support the outer edge 122 of the annular member. Thus, the annular member is rotatably supported, meaning it can rotate about a center axis of the annular member, but is otherwise fixedly held in position.

The two inner ring support rollers 130 prevent the annular member 120 from moving in direction of the cutting area 101, and the two outer ring support rollers 140 prevent the annular member from moving away from the cutting area 101. These support rollers together support the annular member and allows it to rotate, i.e., revolve, around a center axis of the annular member 120 (not shown in FIG. 1). There are also support rollers 150 arranged to support the sides if the annular member 120, i.e., to prevent pivoting of the annular member 120. Here, a pivoting motion is an undesired rotation about any other axis than the annular member center axis.

The support rollers will be discussed in more detail below in connection to FIGS. 7 and 8 below.

The work tool 100 also comprises a support wheel 160 arranged distanced from the annular member 120 away from the cutting area 101, i.e., distanced away from the material to be cut. This support wheel 160 has a diameter smaller than that of the annular member 120. The annular member 120 and the support wheel 160 are arranged in a common plane. The rotational axis of the annular member and the rotational axis of the support wheel are parallel but distanced from each other. A forward direction (shown as 'F' in FIG. 1) of the work tool 100 is defined herein as a direction from the center axis of the support wheel 160 through the center axis of the annular member 120 in direction of the cutting area 101 and in the plane of the annular member and support member. A reverse direction (shown as 'R' in FIG. 1) is opposite to the forward direction F. Thus, the annular member 120 is arranged in the forward direction with respect to the support wheel 160.

The annular member is ring-shaped and therefore centerless. The radial width W, indicated in FIG. 3, of the ring may vary, but a radial width range of between 30-80 mm may be suitable, and preferably about 40 mm or 50 mm. The diameter D of the annular member is according to some aspects selectable to provide different torque or speed ratios and will be discussed in more detail below. The values for the annular member diameter D may vary from about 200 mm to about 800 mm.

The diameter D' of the support wheel is in the range 50-100 mm, and preferably about 70 mm. When selecting the diameter of the support wheel, it is preferred to avoid polygon effects and the like. It is appreciated that the diameter of the support wheel can be selected freely. The diameter of the support wheel and the diameter of the annular member together determine a torque or speed ratio of the work tool.

For example, a ratio D/D' between the annular member diameter D and support wheel diameter D' may be in a range between 3 and 10, and preferably between 4 and 8.

The cutting chain 110 is arranged supported on a rim segment 102 of the annular member 120 forming part of the cutting area 101, and also supported on a rim segment 103 of the support wheel 160 in a direction away from the cutting area 101, i.e., in the reverse direction R. The cutting chain therefore extends from the rim of the support wheel 160 to the rim of the annular member 120 and back again to the support wheel. When used for cutting, the annular member side of the work tool is brought to engage the material to be cut, with the support wheel 160 trailing the annular member. It is appreciated that the rim segment 103 of the support wheel 160 is not in direct engagement with the material to be cut during operation.

Figure 6:
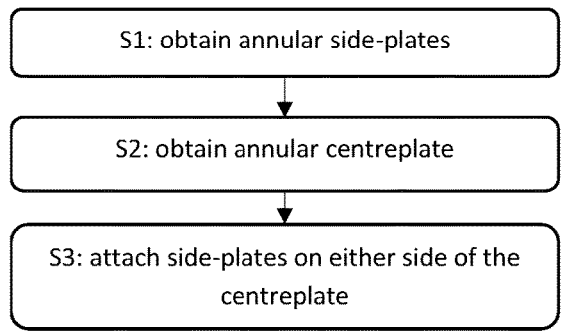
FIG. 6 is a flow chart illustrating methods.

The work tool shown in FIG. 1 enables making deep straight cuts which are particularly desirable when the work tool is used as a wall saw (discussed below in connection to FIG. 13). A wire saw such as disclosed in, e.g., U.S. Pat. No. 6,119,674, is known to divert from a straight cut in case it encounters a region of different hardness, such as a reinforcement bar. Applicant notes that the tool shown in U.S. Pat. No. 6,119,674 is not suitable for use with a chain. This is because the annular member has a v-shaped groove in the rim which is not able to support a cutting chain. Any cutting chain supported by this groove will immediately fold sideways and break when the cutting operation is started. FIG. 6 illustrates an example use for the work tool, where the work tool is used to cut into a wall or the like. The wall material is indicated as W in FIG. 6. It is seen that it is the annular member side of the wok tool that engages the material to be cut, not the support wheel side of the wok tool.

The work tool is advantageously used together with a cutting chain comprising abrasive elements for abrading hard materials such as concrete or stone. However, the cutting chain may also be a cutting chain comprising teeth arranged to cut softer materials like wood.

During a cutting operation by the work tool, the chain is powered by the drive mechanism, whereby the annular member 120 and the support wheel 160 revolves in support of the chain. This means that the chain does not slide on metal, as is often the case with traditional chain saw blades. The present arrangement comprising a revolving annular member reduces friction and alleviates mechanical stress on the chain, thereby providing a more durable and efficient work tool.

The drive mechanism may be any of a combustion engine, an electrical motor, or a hybrid combustion engine and electrical motor drive arrangement. The drive mechanism may also comprise a hydraulic drive arrangement. Due to the relatively low weight of the annular member and chain combination, compared to a cut-off wheel of similar dimension, the disclosed work tool is particularly suitable for use with battery (or other electrical energy storage) powered drive mechanisms. This is at least partly because a low weight annular member requires less energy to bring up to operational rotation speeds compared to a heavier cut-off disc. The battery may be an on-board battery, i.e., a battery comprised in the work tool and carried together with the work tool. Other electrical energy storage devices which may be applicable are, e.g., super-capacitors and fuel cells.

According to some aspects, the drive mechanism is arranged to drive the cutting chain via one or more of the support rollers, e.g., one or both the outer ring support rollers 140 shown in FIG. 1. In this case power is transferred from the power source via the support roller to the annular member 120. The annular member 120 then acts as a large drive wheel or sprocket to drive the cutting chain 110 during the cutting operation.

Figure 14:
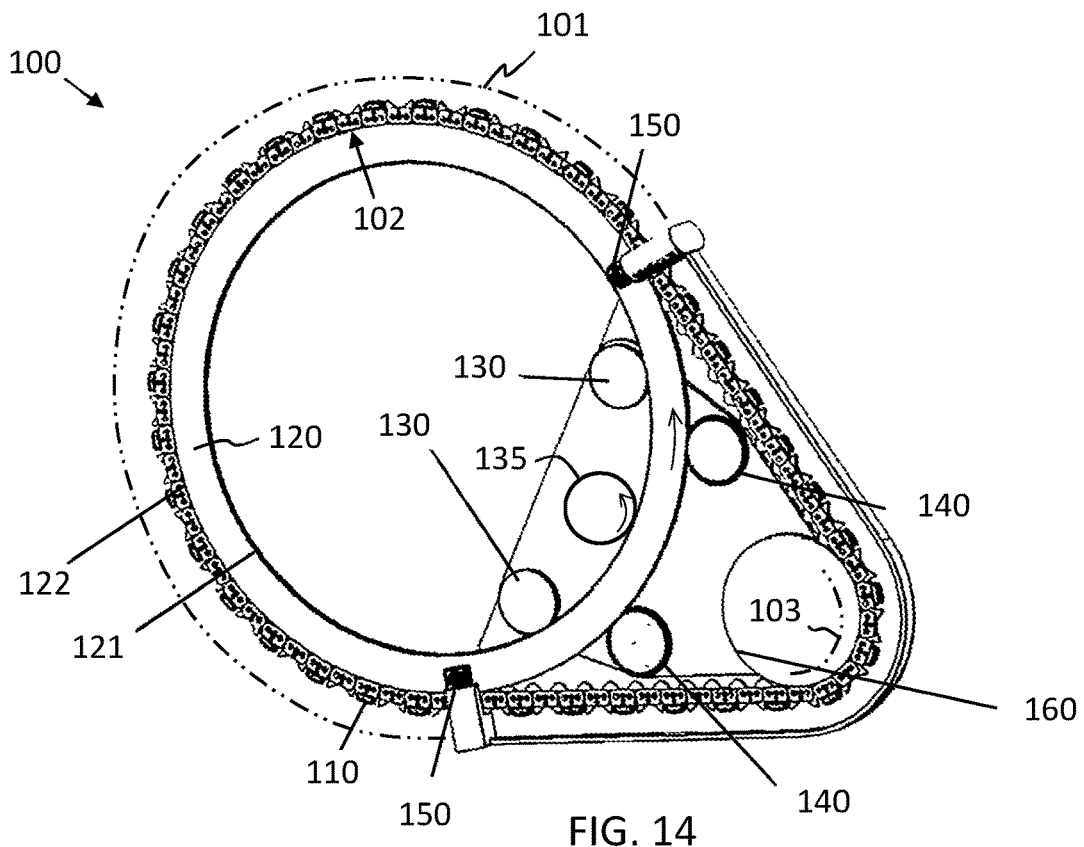
FIG. 14 schematically illustrates a work tool.
Figure 15:
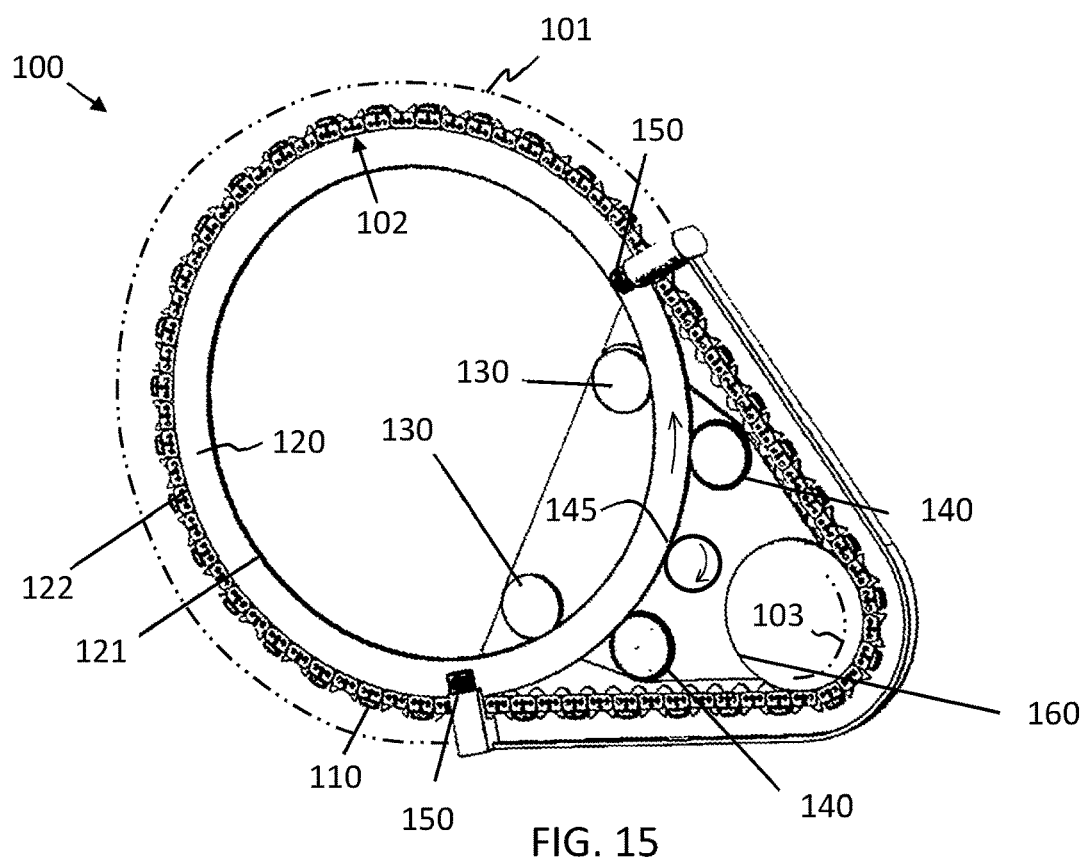
FIG. 15 schematically illustrates a work tool.

FIG. 14 illustrates an example where a separate drive wheel 135 has been arranged to engage the inside edge of the annular member 120. This drive wheel 135 may comprise teeth or protrusions configured to engage corresponding recesses formed in the inside edge of the annular member 120. FIG. 15 illustrates another example where a separate drive wheel 145 has been arranged to engage the outside edge of the annular member 120. The annular member 120 in both examples again acts as a large drive wheel or sprocket to drive the cutting chain 110 during the cutting operation.

Figure 3:
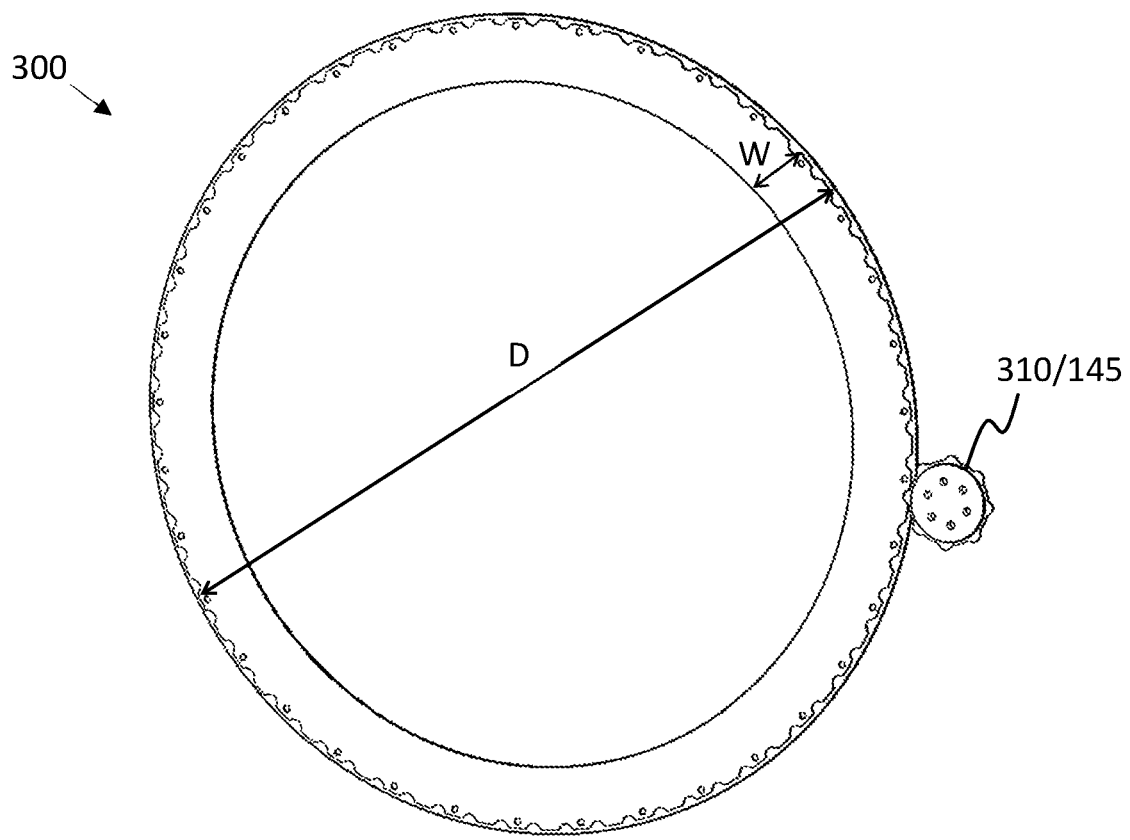
FIGS. 3-4 show parts of an annular member for supporting a chain.

The separate drive wheels 135, 145 may be realized in a manner similar to the drive arrangement shown in FIG. 3.

The annular member 120 may rotate in either clockwise of anti-clockwise direction depending on application. This disclosure is not limited to any particular direction of rotation.

Figure 2:
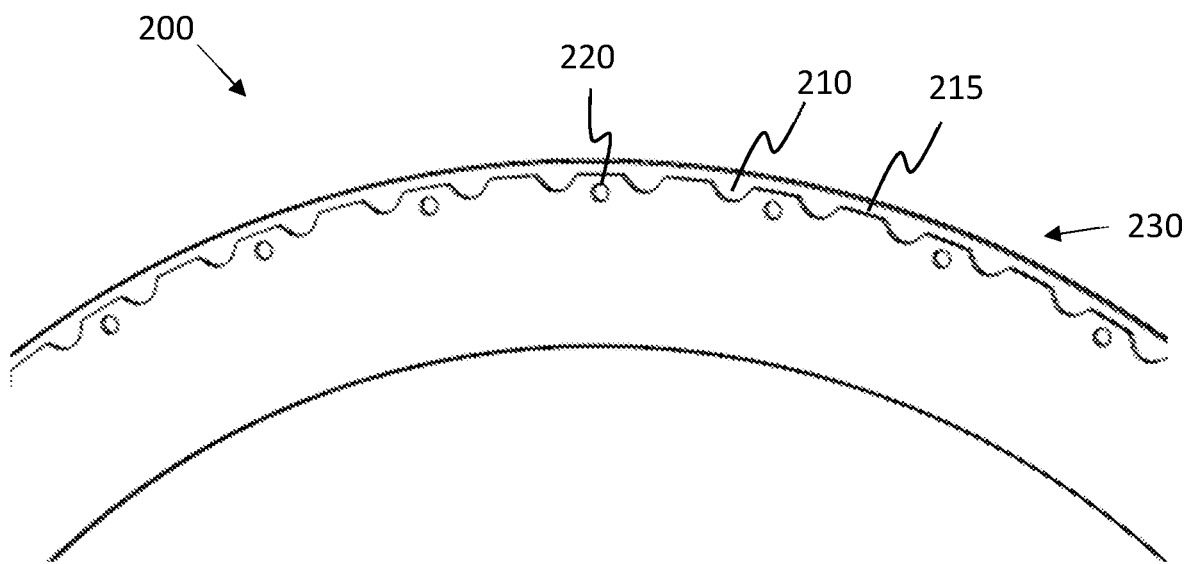
FIG. 2 shows details of an annular member for supporting a chain.

With reference to FIG. 2, the annular member 120 may be configured with recesses 210 and protrusions 215 formed in the outer rim 230 of the annular member 120. These recesses and protrusions may be configured to engage with the cutting chain 110, i.e., the cutting chain 110 optionally comprises protrusions configured to engage corresponding recesses 210 formed in the rim 230 of the annular member 120. Thus, the annular member 120 can be arranged to actually drive the cutting chain during a cutting operation. Due to the large diameter of the annular member compared to a more traditional drive sprocket, the mechanical stress on the cutting chain is distributed over many chain links, thereby prolonging the life of the chain.

Also, the outer ring support rollers 140 may be provided as sprockets configured to engage with the recesses 210 and protrusions 215 of the annular member, thereby providing an efficient power transfer mechanism between drive roller and annular member.

According to some other aspects, the drive mechanism is arranged to drive the support wheel 160. The support wheel 160 then transfers power to the cutting chain 110 similar to the function of a traditional chain saw drive sprocket. Optionally, the support wheel has a rim structure configured engageable with a corresponding structure on the cutting chain 110. For instance, the support wheel 160 may be a drive sprocket having protrusions configured to engage with recesses formed in the cutting chain to drive the cutting chain.

The work tool 102 may comprise a chain brake arranged to stop the chain from rotating. Such a chain brake may optionally be implemented as a disc brake 170 configured to engage the annular member 120. The brake device may also be configured to engage with any of the support rollers 130, 140, 150, or with the support wheel 160 to prevent rotation of the cutting chain 110.

It is appreciated that the drive mechanism can also be configured to drive both an outer ring support roller 140 and the support wheel 160.

Figure 4:
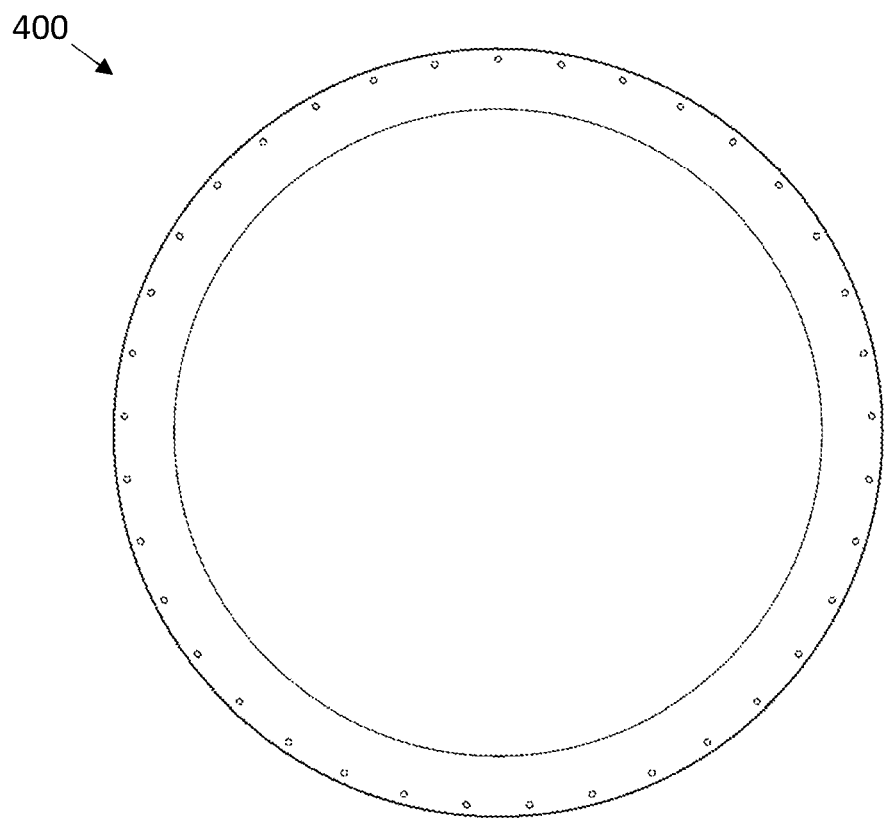

FIGS. 3 and 4 illustrate parts 300, 400 of the annular member 120. According to some aspects, the annular member 120 is formed by two annular side-plates 400 with an annular center-plate 300 arranged in-between the two side-plates 400. The two annular side-plates 400 and the center-plate 200 may, e.g., be riveted 220 together or they may be spot welded together. The center-plate 300 may be configured with a rim portion comprising the recesses 210 configured to engage the corresponding protrusions on the cutting chain 110.

FIG. 3 also shows an optional drive sprocket support roller 310, which may be one of the outer ring support rollers 140.

Figure 5:
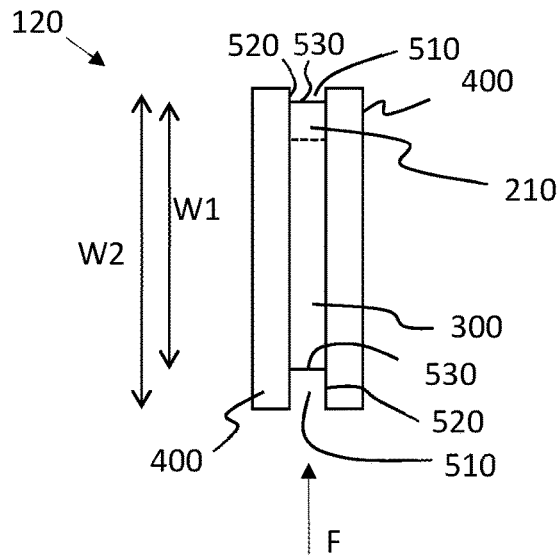
FIG. 5 shows details of an annular member for supporting a chain.

FIG. 5 is a cross-sectional view of an example annular member 120 for a work tool 100. The annular member 120 is formed by two annular side-plates 400 with an annular center-plate 300 arranged in-between the two side-plates 400, wherein the center-plate 300 has a rim portion comprising recesses 210 configured to engage corresponding protrusions on a cutting chain 110 of the work tool 100.

The center-plate 300 may be configured with a radial width W1 slightly smaller than a radial width W2 of the side-plates. The radial width W schematically illustrated in FIG. 3 may, e.g., be a maximum width of the annular member 120.

The annular member 120 generally comprises a groove 510 formed in the rim of the annular member 120 in which the chain is supported. This groove 510 has side walls 520 extending substantially parallel to an extension plane of the annular member 120, and a bottom portion 530 substantially orthogonal to the side walls, i.e., parallel to the axis of rotation of the annular member 120 as illustrated in FIG. 5.

Other shapes of the groove 510 are also possible, although a groove with a bottom portion 530 extending parallel to the axis of rotation of the annular member 120 is desired in order to provide support for the chain against a pressure F exerted by the material to be cut in direction towards a center of rotation of the annular member 120. It is also desirable that the shape of the groove is matched to the shape of the portion of the chain arranged to be received in the groove.

FIG. 6 is a flow chart schematically illustrating a manufacturing method to produce an annular member 120 for a work tool 100. The method comprises obtaining S1 two annular side-plates 400, obtaining S2 an annular center-plate 300, wherein the center-plate 300 has a rim portion comprising recesses 210 configured to engage corresponding protrusions on a cutting chain 110 of the work tool 100, and attaching S3 the side-plates on either side of the center-plate to produce the annular member 120.

The side-plates 400 and the center plate 300 may be laser cut into shape, which is a cost effective and high precision way to manufacture the parts for the annular member.

Spot welding may be preferred in order to assemble the parts of the annular member, although riveting is also possible, or even gluing the side-plates to the center-plate.

A problem associated with many known work tools is to provide different drive speed or torque ratios. Often, a gearbox is provided in order to allow selection of different drive speed or torque ratios. Advantageously, the present design does not require a gear-box since the annular member is optionally arranged to be replaceable by one or more alternative annular members having different diameters, thereby providing for different speed or torque ratios between cutting chain and drive mechanism. The different annular members and the work tool may be provided as a kit of parts.

In order to replace the annular member with an alternative annular member having different diameter, the support rollers 130, 140, 150 must be movable in order to accommodate the different annular members with different diameters. For instance, the support rollers 130, 140, 150 may be spring biased to press against the annular member 120. The support rollers may also be arranged with releasable tensioning mechanisms that can be disengaged during annular member replacement operation and then engaged again to hold the new annular member in place.

According to some aspects, the support wheel 160 is also used as a tensioning mechanism to provide a controlled amount of tension to the cutting chain 110. In this case the support wheel is arranged biased in a direction away from the annular member 120, i.e., in the reverse direction R, thereby providing tensioning of the cutting chain 110.

The inner and outer ring support rollers 130, 140 may also be configured to provide a tensioning function. The inner and outer ring support rollers are arranged biased in the direction of the cutting area 101, i.e. away from the support wheel 160 in the forward direction, the annular member 120 thus becomes biased in the direction away from the support wheel (160), thereby providing tensioning of the cutting chain 110.

In some cutting scenarios flush cutting is desired. The outer support rollers 150 may then be removed in order to allow the flush cutting operation. When the work tool 100 is used in a wall saw arrangement, overcut can be reduced by allowing the tool to cut using the flat portion of the chain 110 between the annular member and the support wheel 160.

Figure 7:
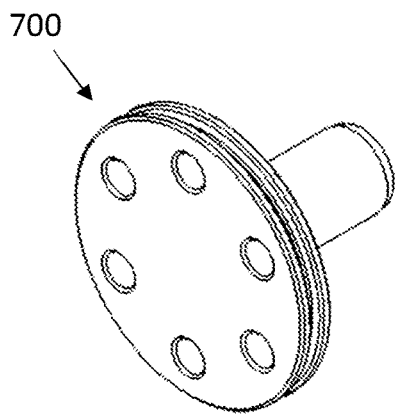
FIGS. 7-8 illustrate example support rollers.
Figure 8:
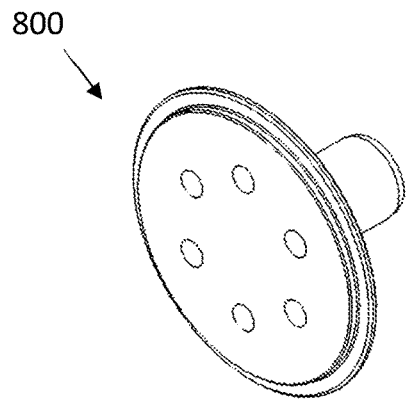

FIGS. 7 and 8 illustrate example support rollers 700, 800.

Figure 9:
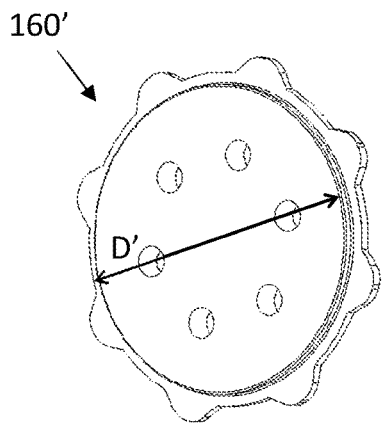
FIG. 9 schematically illustrates a drive sprocket.

FIG. 9 shows a support wheel configured as a drive sprocket 160'.

Figure 10:
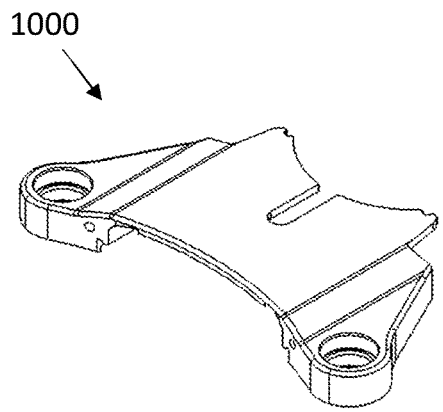
FIGS. 10-12 schematically illustrate details of a cutting chain.
Figure 11:
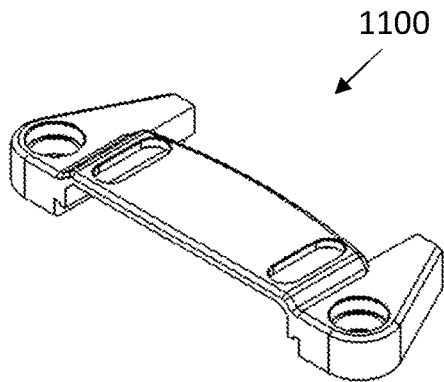
Figure 12:
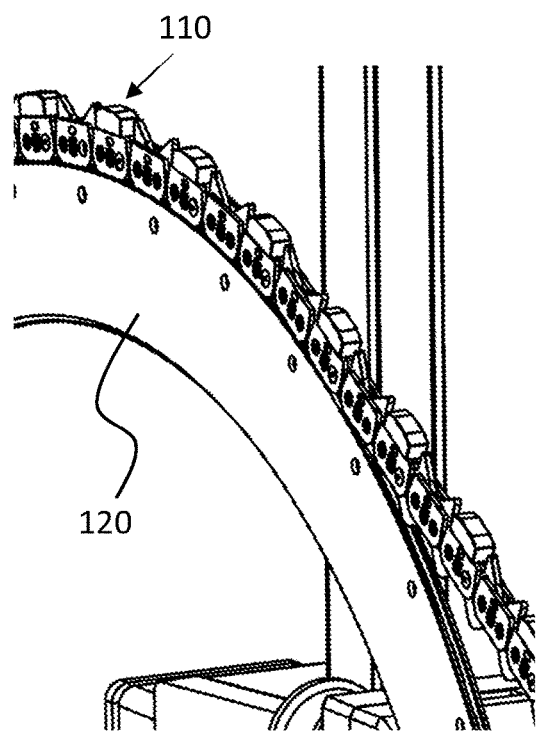

FIGS. 10-12 show details of an example cutting chain 110 for use with the work tool 100.

Figure 13:
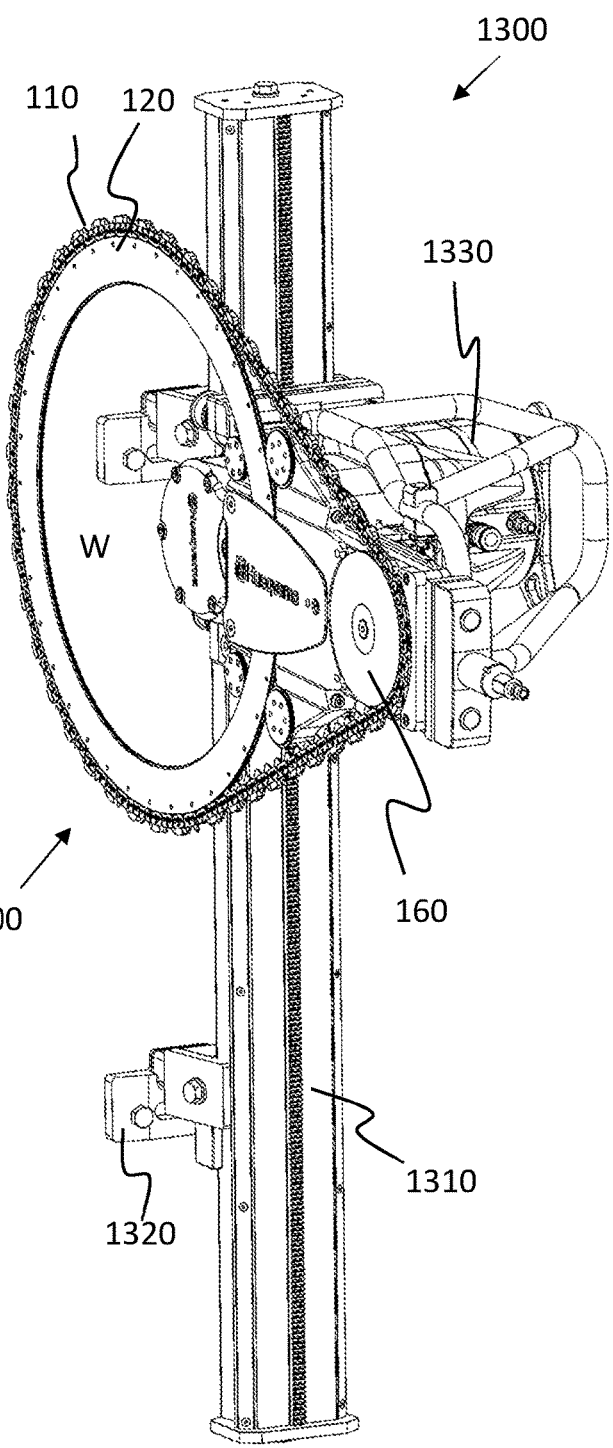
FIG. 13 schematically illustrates a wall saw arrangement.

FIG. 13 schematically illustrates a wall saw arrangement 1300 comprising the work tool 100 according to the discussions above. The wall saw comprises a column or support rig 1310 along which the work tool 100 is arranged to traverse. The support rig 1310 is arranged to be fixedly attached 1320 by, e.g., bolting, to the wall W or other flat surface which is to be cut. Wall saw operating machinery 1330 is arranged to move the work tool 100 along the column and also to move the work tool cutting area against the material to be cut.

The invention claimed is:

1. A work tool, comprising;
   a cutting chain,
   a drive mechanism for driving the cutting chain,
   an annular member arranged rotatably supported by one or more support rollers, wherein the annular member comprises a rim adapted to support the cutting chain during cutting, and
   a support wheel arranged distanced from the annular member away from a cutting area of the work tool,
   wherein the cutting chain is arranged supported on a rim segment of the annular member, and supported on a rim segment of the support wheel, wherein the rim segment of the annular member forms part of the cutting area of the work tool,
   wherein the annular member is replaceable by one or more alternative annular members having different diameters, thereby providing for different speed or torque ratios between the cutting chain and the drive mechanism.

2. The work tool according to claim 1, wherein the cutting chain comprises teeth for cutting wood, or
   wherein the cutting chain comprises abrasive elements for cutting concrete or stone.

3. The work tool according to claim 1, wherein the drive mechanism is arranged to drive one or more of the support rollers.

4. The work tool according to claim 3, wherein a sprocket constitutes one of the support rollers.

5. The work tool according to claim 1, wherein the cutting chain comprises a surface structure configured to engage with a corresponding rim structure on the annular member.

6. The work tool according to claim 5, wherein the surface structure on the cutting chain comprises protrusions configured to engage corresponding recesses formed in the rim of the annular member.

7. The work tool according to claim 1, wherein the annular member is formed by two annular side-plates with an annular center-plate arranged in-between the two side-plates.

8. The work tool according to claim 7, wherein the center-plate has a rim portion comprising recesses configured to engage corresponding protrusions on the cutting chain.

9. The work tool according to claim 7, wherein the two annular side-plates and the center-plate are riveted together.

10. The work tool according to claim 7, wherein the two annular side-plates and the center-plate are spot welded together.

11. The work tool according to claim 1, wherein the support wheel is biased in a direction away from the annular member, thereby providing tensioning of the cutting chain.

12. The work tool according to claim 1, wherein the support wheel is a drive sprocket arranged to drive the cutting chain.

13. The work tool according to claim 1, wherein one or more of the support rollers are biased in a direction away from the support wheel, thereby biasing the annular member in the direction away from the support wheel to provide tensioning of the cutting chain.

14. The work tool according to claim 1, wherein an outer support roller out of the support rollers is removable for flush cutting operation by the work tool.

15. The work tool according to claim 1, wherein the drive mechanism is powered by an electrical energy storage.

16. The work tool according to claim 1, comprising a brake device arranged to stop a rotation of the annular member.

17. The work tool according to claim 1, wherein the work tool is a handheld power cutter.

18. An annular member for a work tool, the annular member being formed by two annular side-plates with an annular center-plate arranged in-between the two side-plates, wherein one or both of the side-plates and the center-plate have a rim portion comprising recesses configured to engage corresponding protrusions on a cutting chain of the work tool, wherein the annular member comprises an inner edge and an outer edge, and is rotatably supported by one or more support rollers such that the support rollers rotate to engage one or both of the inner edge and the outer edge of the annular member to drive the cutting chain of the work tool via at least one of the support rollers.

19. A manufacturing method to produce an annular member for a work tool, the method comprising:
    obtaining two annular side-plates,
    obtaining an annular center-plate, wherein one or both of the side-plates and the center-plate have a rim portion comprising recesses configured to engage corresponding protrusions on a cutting chain of the work tool, and
    attaching the side-plates on either side of the center-plate to produce the annular member,
    wherein the annular member comprises an inner edge and an outer edge, and is rotatably supported by one or more support rollers such that the support rollers rotate to engage one or both of the inner edge and the outer edge of the annular member to drive the cutting chain of the work tool via at least one of the support rollers.

* * * * *